Patented Apr. 27, 1937

2,078,911

UNITED STATES PATENT OFFICE 2,078,911

ADHESION OF RUBBER

James A. Merrill, Akron, Ohio, assignor to Wingfoot Corporation, Wilmington, Del., a corporation of Delaware No Drawing. Application September 28, 1934, Serial No. 745,850

2 Claims. (Cl. 154—2)

This invention relates to the adhesion of rubber to base materials. More particularly the invention relates to the treatment of cured rubber with a compound of an amphoteric metal and the securing of this treated surface to a base material by a suitable adhesive.

In general the methods previously suggested for cementing cured rubber to base materials such as metal, wood, glass, etc. have proved unsatisfactory because of the poor bond formed between the rubber and the adhesive employed.

According to this invention the surface of the rubber which is to be bonded to the base is first treated with a halide of an amphoteric metal or derivative thereof such as phosphorus oxychloride. The treated surface is then bonded to the base by a suitable adhesive. Preferably the rubber is first cured to the desired shape and the surface of the cured rubber is then treated with the compound of the amphoteric metal in order to produce a surface which gives a good bond with the adhesive employed. The rubber may be treated with the compound of the amphoteric metal before curing and then be united to the base either before or after or during the curing. The adhesive to be employed will depend upon the nature of the base and the conditions under which the assembled product is to be used. For example, if the assembled product is to be used at high temperatures a thermoset adhesive is advantageously used. If the base is glass an adhesive which forms a strong bond with glass is to be employed. Similarly if the base is wood or metal, an adhesive which forms a strong bond with these materials is used. The treated rubber surface forms a strong bond with any adhesive such as glue, shellac, a thermoplastic rubber derivative, e. g. a condensation derivative of rubber, or resins such as a phenol formaldehyde, styrene, glycerol phthalic anhydride, etc.

In general it is preferable to apply the adhesive as a solution although with certain adhesives, the adhesive may be applied as a thin sheet or fine powder and then be heated with pressure to secure the desired bond. The adhesive in solution may be applied to either the treated rubber surface or the base or preferably to both. The rubber and base may be pressed together while the adhesive is still tacky or with suitable adhesives, such as solutions of shellac or thermo-setting resins in a volatile solvent, the solvent may be allowed to evaporate and the dried treated surfaces then pressed together with sufficient heat to bind the surfaces together, and in the case of a thermo-setting resin, to set the resin.

According to this invention the surface of the rubber which is to be bonded to the base is treated with an anhydrous halide compound of an amphoteric metal and preferably a solution of such a compound in an organic solvent which swells the rubber. For example the cured rubber may be soaked in a solution of tin tetrachloride in ethylene dichloride, or only that portion of the surface which is to be cemented to the base may be subjected to the treatment. The solution may be applied by brushing if desired. A 2% solution of tin tetrachloride in ethylene dichloride if allowed to react on the rubber for about three minutes gives a surface which forms a strong bond with the various adhesives. The strength of the tin tetrachloride may be varied but a 1 to 5% solution is preferred. The time of treatment may be varied as a stronger or weaker solution is used. Other anhydrous halides of amphoteric metals may be satisfactorily employed, for example a 2% solution of boron fluoride in ethylene dichloride gives a satisfactory surface in about five minutes. Other anhydrous halides which may be employed are chromic chloride, aluminum chloride, phosphorus trichloride, ferric chloride, antimony trichloride, etc. Instead of ethylene dichloride other solvents or mixture of solvents such as benzene, acetone, ethyl acetate, butyl alcohol, dichlor ethyl ether, iso-amylchloride, etc. may be substituted.

After the treatment of the rubber surface with the compound of the amphoteric metal the treated surface is washed to remove any reagent which has not entered into the reaction. Alcohol, acetone or water are most satisfactory for this purpose. If the rubber is to be bonded to metal the surface of the metal is preferably sand blasted or pickled. Other bases should be thoroughly cleaned before applying the adhesive.

I claim:

1. The method of bonding cured rubber to a base which comprises treating a surface of the rubber with a solution of a halide of an amphoteric metal in a solvent which swells the rubber and then bonding the treated surface of the rubber to the base by a thermo-setting resin.

2. The method of bonding cured rubber to metal which comprises resinifying a surface of the rubber with tin tetrachloride and then bonding the treated surface of the rubber to the metal by a thermo-setting resin.

JAMES A. MERRILL.